(12) United States Patent
Jeker et al.

(10) Patent No.: US 10,480,558 B2
(45) Date of Patent: Nov. 19, 2019

(54) CONNECTING DEVICE AND METHOD FOR FIXING A CONNECTING ELEMENT TO OR IN A COMPONENT

(71) Applicant: Lamello AG, Bubendorf (CH)

(72) Inventors: Patrick Jeker, Brislach (CH); Philipp Seiler, Arboldswil (CH)

(73) Assignee: Lamello AG, Bubendorf (CH)

( * ) Notice: Subject to any disclaimer, the term of this patent is extended or adjusted under 35 U.S.C. 154(b) by 276 days.

(21) Appl. No.: 15/398,876

(22) Filed: Jan. 5, 2017

(65) Prior Publication Data

US 2017/0114812 A1    Apr. 27, 2017

Related U.S. Application Data

(63) Continuation of application No. PCT/EP2015/065156, filed on Jul. 2, 2015.

(30) Foreign Application Priority Data

Jul. 8, 2014    (DE) .......................... 10 2014 109 547

(51) Int. Cl.
*F16B 12/20* (2006.01)

(52) U.S. Cl.
CPC .................................. *F16B 12/20* (2013.01)

(58) Field of Classification Search
CPC .......... F16B 12/20; F16B 12/24; F16B 12/26; Y10T 403/55; Y10T 403/559;

(Continued)

(56) References Cited

U.S. PATENT DOCUMENTS 5,096,328 A * 3/1992 Knapp .................... F16B 12/20
403/340
5,529,428 A * 6/1996 Bischof ................... F16B 12/14
403/408.1

(Continued)

FOREIGN PATENT DOCUMENTS

DE    32 12 160 A1    10/1983
DE    295 11 111 U1    10/1995

(Continued)

*Primary Examiner* — Jonathan P Masinick
(74) *Attorney, Agent, or Firm* — Aslan Law, P.C.

(57) ABSTRACT

In order to create a connecting device for fixing and/or connecting objects or components, in particular for connecting furniture or machine parts, which connecting device comprises one or more connecting elements which are easily and reliably fixable in or to one or more components, it is proposed that the connecting device comprise at least one connecting element which is fixable in or to a component and comprises the following: a main body and one or more securing elements, wherein the one or more securing elements are formed in one piece with the main body in an initial position of the connecting device, wherein the one or more securing elements are detachable from the main body by destroying a predetermined break-away region between the main body and the one or the plurality of securing elements and wherein the one or the plurality of securing elements are moveable from the initial position into a securing position for the purposes of fixing the main body in or to the component.

20 Claims, 11 Drawing Sheets

(58) Field of Classification Search
CPC ......... Y10T 403/5773; Y10T 403/5793; A47B 2230/062
See application file for complete search history.

(56) References Cited

U.S. PATENT DOCUMENTS

| | | | | |
|---|---|---|---|---|
| 8,092,114 | B2* | 1/2012 | Baur | E05B 63/123 403/254 |
| 8,240,942 | B2* | 8/2012 | Baur | B23C 5/08 403/292 |
| 8,641,315 | B2* | 2/2014 | Liu | A47B 95/00 403/297 |
| 10,113,575 | B2* | 10/2018 | Baur | F16B 12/20 |
| 2010/0111598 | A1 | 5/2010 | Baur et al. | |
| 2014/0341644 | A1* | 11/2014 | Maertens | A47B 95/00 403/297 |

FOREIGN PATENT DOCUMENTS

| | | |
|---|---|---|
| DE | 20 2005 009 004 U1 | 1/2007 |
| EP | 1 990 549 A1 | 11/2008 |

\* cited by examiner

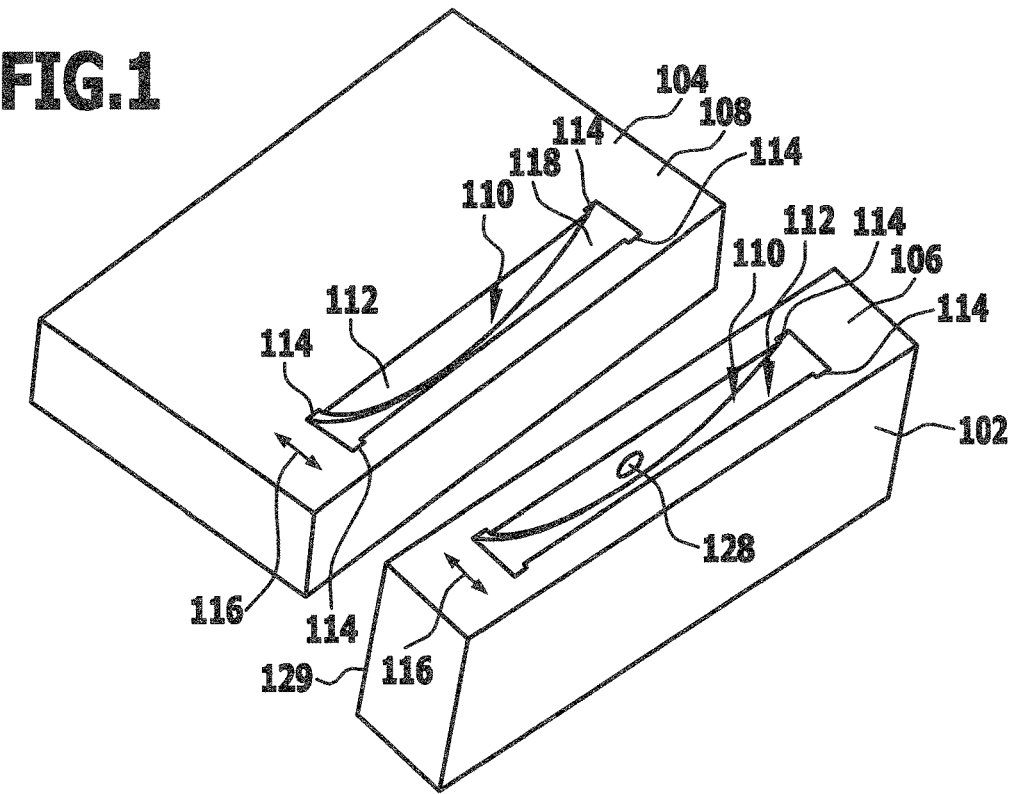
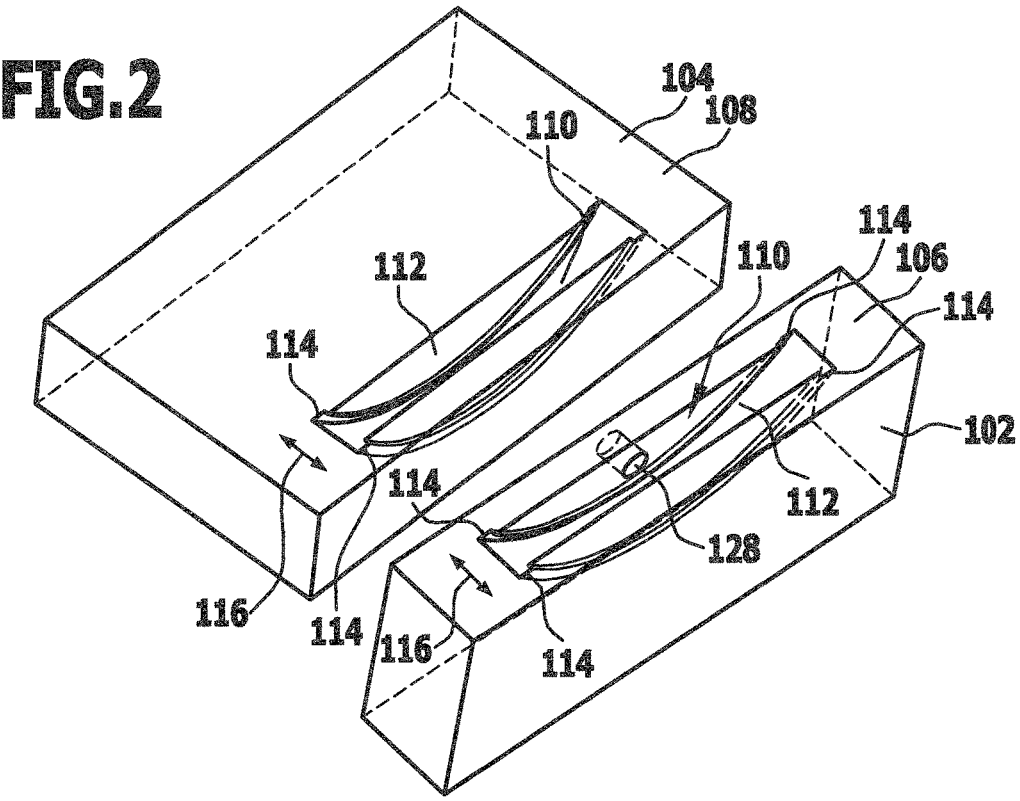

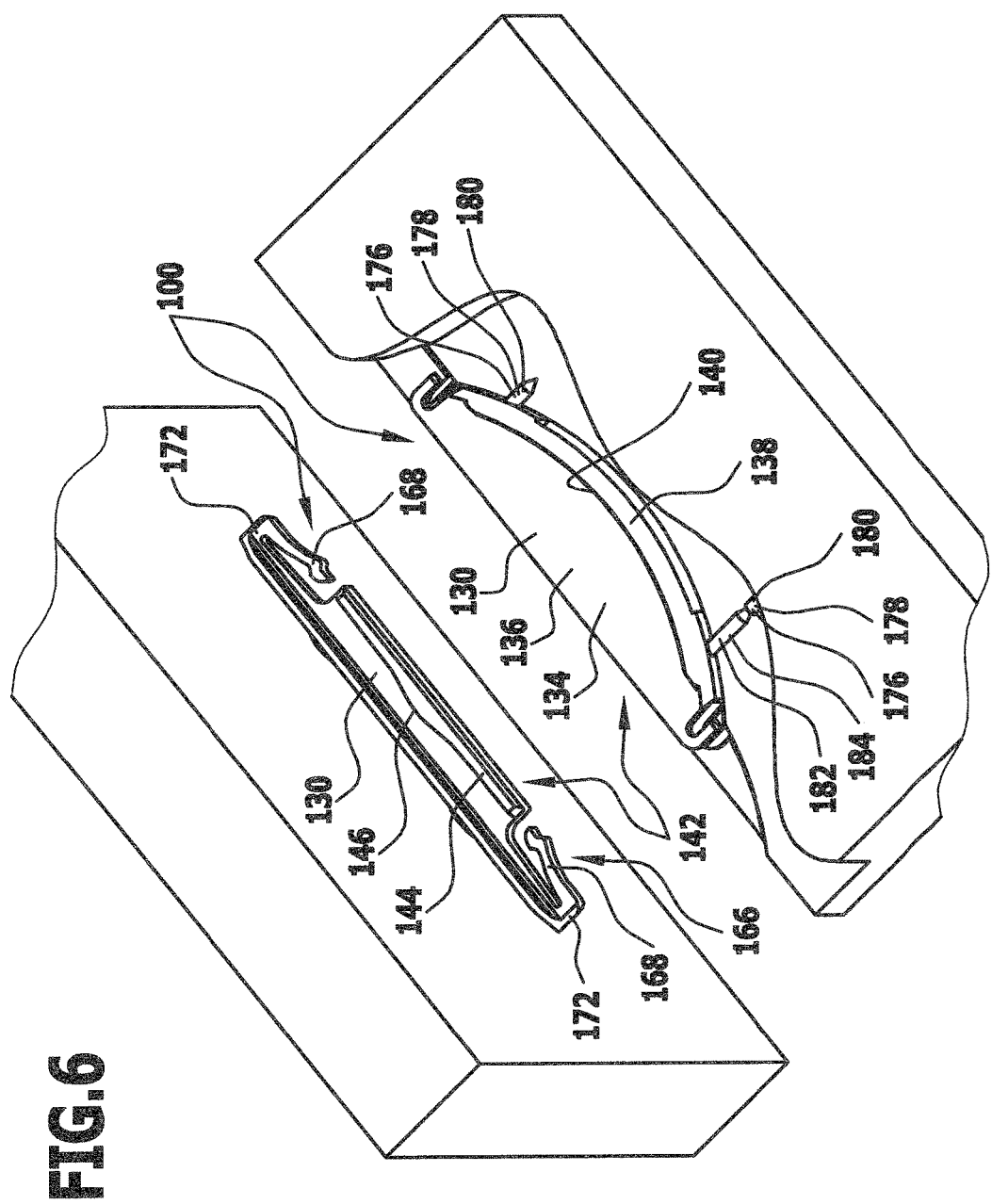

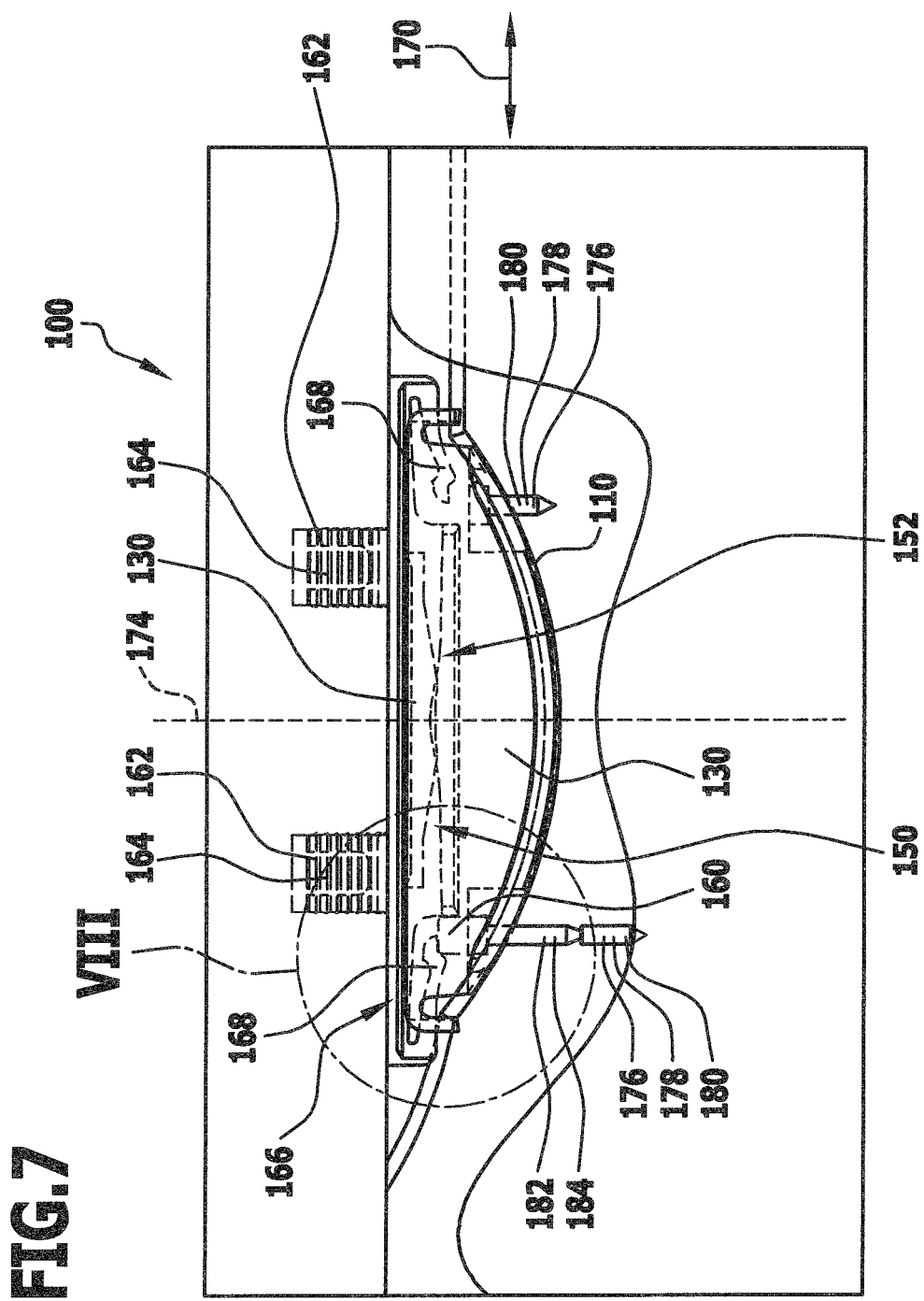

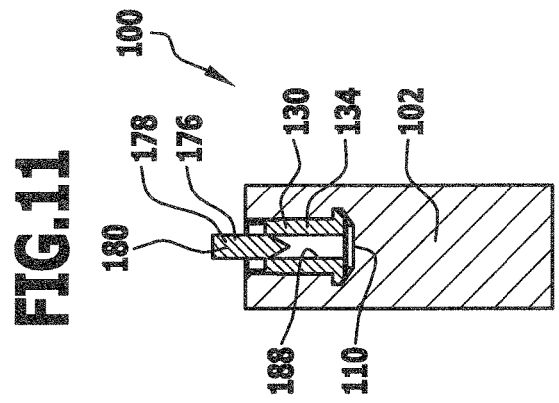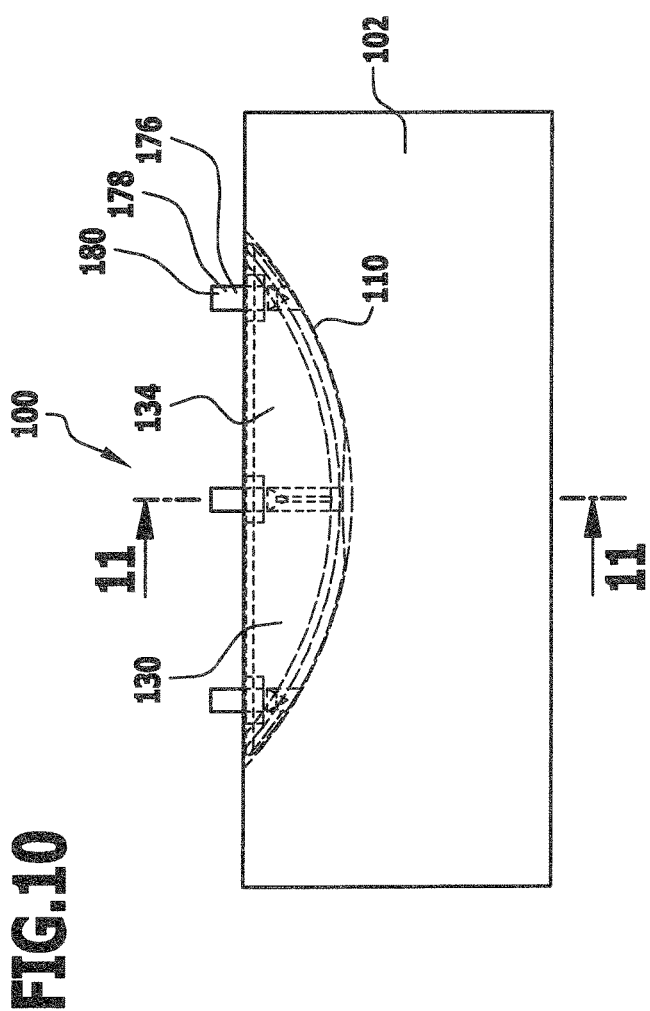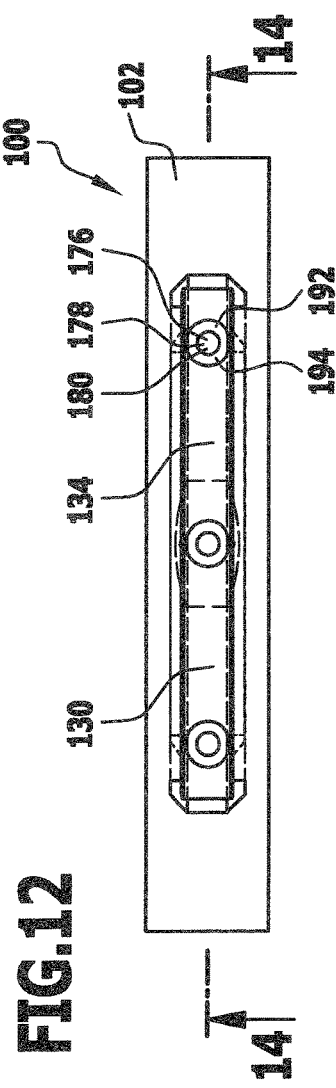

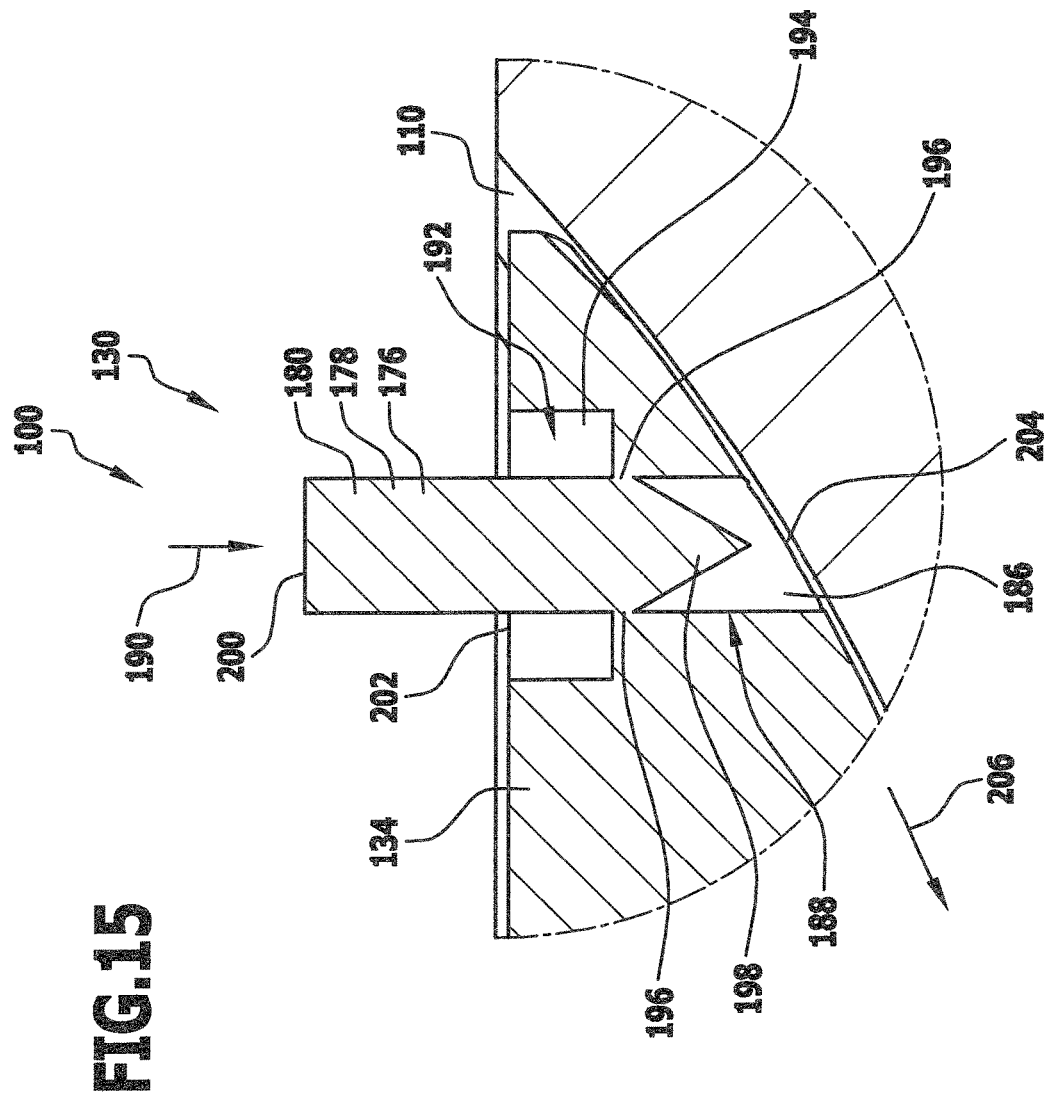

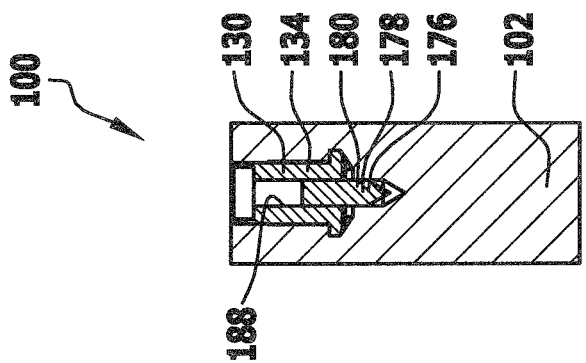
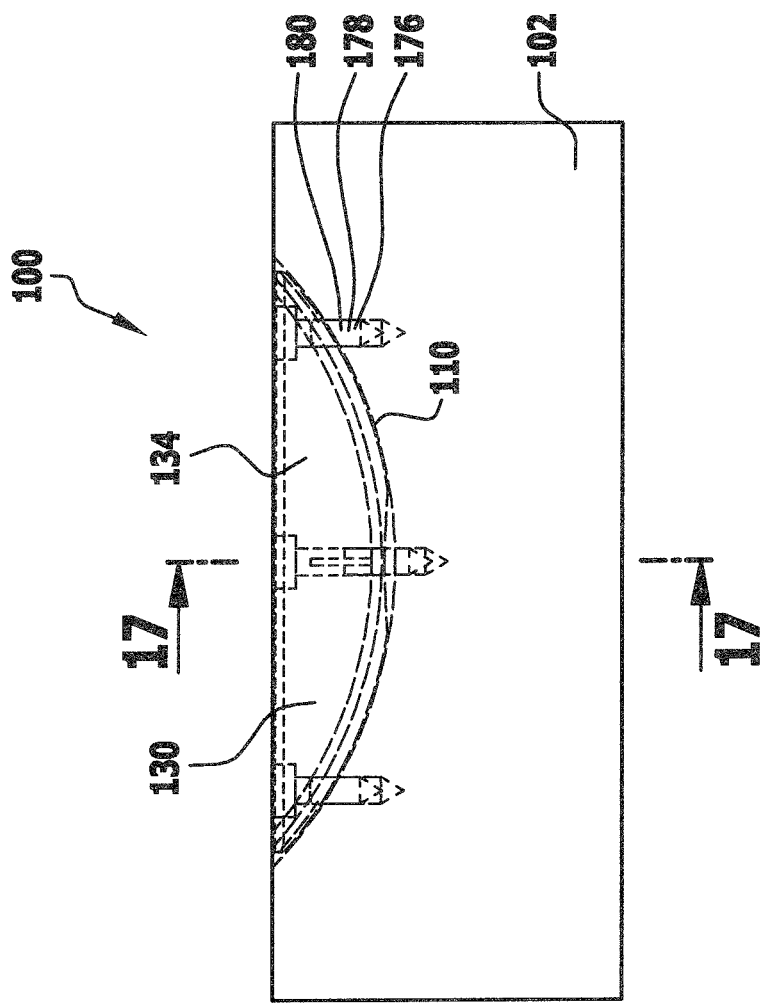

CONNECTING DEVICE AND METHOD FOR FIXING A CONNECTING ELEMENT TO OR IN A COMPONENT

RELATED APPLICATION

This application is a continuation of international application No. PCT/EP2015/065156 filed on Jul. 2, 2015, and claims the benefit of German application No. DE 10 2014 109 547.2 filed on Jul. 8, 2014 which are incorporated herein by reference in their entirety and for all purposes.

FIELD OF DISCLOSURE

The present invention relates to a connecting device for fixing and/or connecting objects or components, in particular for connecting furniture or machine parts.

BACKGROUND

Connecting device of this type are known from EP 1 990 549 A1 for example.

SUMMARY OF THE INVENTION

The object of the present invention is to provide a connecting device for fixing and/or connecting objects or components which comprises one or more connecting elements that are easily and reliably fixable in or to one or more components.

In accordance with the invention, this object is achieved by a connecting device for fixing and/or connecting components or objects, in particular for connecting furniture or machine parts, wherein the connecting device comprises at least one connecting element which is fixable in or to a component and comprises the following:

a main body and one or more securing elements, wherein the one or the plurality of securing elements are formed in one piece with the main body in an initial position of the connecting device, wherein the one or the plurality of securing elements are detachable from the main body by destroying a predetermined break-away region between the main body and the one or the plurality of securing elements and wherein the one or the plurality of securing elements are moveable from the initial position into a securing position for the purposes of fixing the main body in or to the component.

Due to the fact that the connecting device according to the invention comprises one or more securing elements which are at first formed in one piece with the main body and are detachable from the main body and are moveable into a securing position for fixing the main body in or to a component, it is possible to achieve simple and practical handling of the connecting device on the one hand and reliable and secure fixing thereof in or to one or more components.

In this description and the accompanying Claims, the fixing of and/or a connection of two components is preferably to be understood as being any kind of fixed or moveable fixing of the components relative to each other, including the stationary fixing of the components relative to each other and including the connection of the components to one another such as to enable a given relative movement of the components relative to each other.

In this description and the accompanying Claims, the fixing of and/or connection of objects is preferably to be understood as the fixing of a connecting element to a component wherein the connecting element preferably comprises an object and/or a seating for an object. The object is thus fixable to and in particular anchorable in the component by means of the connecting element.

For the purposes of anchoring an object to a component, provision can thus be made for the connecting device to comprise just one single connecting element which, for example, is fixable to only one component in order to enable a separate object to be fixed and in particular anchored to the component.

The object can be an article of clothing for example. A seating for the object which is preferably arranged and/or formed on a connecting element is then in the form of a coat hook for example.

As an alternative or in addition thereto, provision may be made for the object to be a lighting fixture and in particular a lamp. In particular, such a lighting fixture can then be integrated into a connecting element or be arrangeable thereon.

Furthermore, provision may be made for an object to have additional functions, in particular, functions that are independent of a pure connecting function, and to be fixable to a part and in particular anchorable thereto by means of at least one connecting element.

In this description and the accompanying Claims, a connecting state or a connected state is preferably to be understood as a state of the connecting device in which one or more connecting elements are fixed to one or more components and/or are connected to one another.

When using just one connecting element, a connected state is preferably the state in which the connecting element is fixed and in particular anchored to or in a part.

In the case of a connection of two components to one another, a connected state is preferably the state in which the components are firmly connected together by means of the connecting device or are arranged on one another in moveable manner such as to allow relative movement thereof.

In one embodiment of the invention, provision may be made for the at least one connecting element to comprise one or more securing elements in the form of a locking pin or a security bolt.

A securing element can, for example, be substantially cylindrical and in particular circular cylindrical.

Provision may be made for a connecting element to comprise a pointed end at the front thereof with respect to a securing direction, a direction of movement or an operating direction.

With respect to a securing direction, a direction of movement or an operating direction, an end arranged at the back is, for example, formed flat or provided with a recess. In this way, the connecting element can be operated in a particularly simple and reliable manner. For example, an actuating element can easily engage with the securing element for the purposes of actuating the securing element.

It can be advantageous for a connecting element to be of solid construction.

In particular, provision may be made for a connecting element to be in the form of a solid element of plastics material.

All of the previous and also all of the following comments relating to the design of individual elements, components, sections or other constituents of the connecting device may only apply in one embodiment of the invention for example, to a single element, a single component, a single section or a single other constituent of the connecting device. However provision may also be made for two or more of the respective elements, components, sections and/or constituents of the connecting device to exhibit the features and/or advantages mentioned.

It can be advantageous for the main body to comprise a guide section by means of which and/or along which the one or the plurality of securing elements are guidable or conveyable from the initial position into the securing position.

In particular, provision may be made for the guide section to be formed by one or more through openings in the main body within which the one or the plurality of securing elements are guided or conveyed.

One or more through openings are preferably in a form which corresponds at least in sections thereof to an external shape of the one or the plurality of securing elements.

In particular, provision may be made for one or more through openings to be formed at least in sections thereof to be complementary to at least one section of the one or the plurality of securing elements.

In one embodiment of the invention, provision may be made for the one or the plurality of securing elements to project out of one or more through openings of the main body in the initial position and/or in the securing position.

Provision may be made for the one or the plurality of securing elements to project out of one or more through openings of the main body in both the initial position and in the securing position.

It can be expedient for the one or the plurality of securing elements to project out of one or more through openings of the main body in mutually different directions in the initial position on the one hand and in the securing position on the other.

For example, provision may be made for the one or the plurality of securing elements to project out from a respective through opening at a first end of the one or the plurality of through openings in the initial position, in particular, exclusively.

As an alternative or in addition thereto, provision may be made for the one or the plurality of securing elements to project out of a respective through opening at a second end of the one or more through openings that is opposite to the first end in the securing position, in particular, exclusively.

By actuation of the one or the plurality of securing elements, the one or the plurality of securing elements are preferably movable in such a manner that a section of the respective securing element projecting out from the main body before the actuation process is arranged in the main body after the actuation process, whereas a section of the respective securing element that was arranged in the main body before the actuation process preferably projects out from the main body after the actuation process.

Provision may be made for the predetermined break-away region between the main body and the one or the plurality of securing elements to be arranged recessed in the main body.

In this description and the attached Claims, reference to the predetermined break-away region is always made in the singular. Hereby however, a predetermined break-away region is not to be understood as being just a single coherent region, but rather all regions or sections between the main body and the one or the plurality of securing elements which are destroyed for detaching the one or the plurality of securing elements from the main body.

The predetermined break-away region between the main body and the one or the plurality of securing elements is preferably arranged to be spaced from both ends of the one or the plurality of through openings in the main body.

Provision may be made for the main body and the one or the plurality of securing elements to be in the form of a one piece injection moulded component in the initial position of the one or the plurality of securing elements.

The main body preferably comprises a bearing section upon which there is placeable an operating device by means of which the one or the plurality of securing elements are moveable from the initial position into the securing position.

Preferably, a plurality of securing elements are moveable simultaneously from the initial position into the securing position by means of the operating device and/or by means of a single operating movement.

Consequently, the present invention also relates to a combination of a connecting device and an operating device for actuating the one or the plurality of securing elements.

The operating device preferably comprises one or more bearing sections which are preferably formed such as to be substantially complementary to one or more bearing sections of the main body.

It can be advantageous for the bearing section of the main body to comprise one or more annular recesses.

The one or more annular recesses are preferably arranged concentrically and/or coaxially around the one or the plurality of securing elements.

In particular in the case where the bearing section of the main body comprises one or more annular recesses, the operating device then preferably comprises one or more annular projections so that the operating device is easily and reliably placeable on the connecting device for the purposes of actuating the one or the plurality of securing elements.

In one embodiment of the invention, provision may be made for the main body to be insertible in a direction of insertion into a groove which is provided in or on the component.

The one or the plurality of securing elements are preferably movable transversely and in particular at an angle or perpendicularly to the direction of insertion for the purposes of fixing said elements in the securing position.

The main body is preferably fixable in the groove with positive engagement with respect to the direction of insertion by means of the one or the plurality of securing elements.

It can be advantageous for the main body to comprise a curved bearing surface which is in the form of an arc of a circle in a longitudinal section.

A groove provided in a component preferably comprises a groove base which is in the form of an arc of a circle in a longitudinal section. The main body which preferably comprises a curved bearing surface that is in the form of an arc of a circle in a longitudinal section can then be easily introduced into the groove and glide on the groove base, in particular, by means of the bearing surface.

A longitudinal section is to be understood in particular as being a section in a plane in which the preferably curved direction of insertion lies.

It can be advantageous for the main body to comprise one or more non-self-cutting retaining projections.

The one or the plurality of non-self-cutting retaining projections each preferably has a curved supporting surface which is in the form of an arc of a circle in a longitudinal section.

The one or the plurality of retaining projections are preferably insertible into a groove which is provided in the component and which has a curved under-cut surface that is in the form of an arc of a circle in a longitudinal section.

The groove preferably comprises a base section and one or more under-cut sections which extend away from the base section in a thickness direction.

The one or the plurality of retaining projections preferably engage in the one or the plurality of under-cut sections of the groove in a connecting state.

A connection between the main body and the component is preferably producible by means of the one or the plurality of non-self-cutting retaining projections and the one or the plurality of curved under-cut surfaces which is such that the main body is movable exclusively along the curved direction of insertion.

It can be advantageous for the main body, in particular the entire connecting element, to be arrangeable substantially entirely in a groove of the component so that the main body, in particular the entire connecting element, does not protrude beyond a contact surface of the component.

A contact surface is preferably that surface of the component in which the groove is arranged and in which, for example, a further component is placeable when the connecting device serves for connecting the two components.

It can be advantageous for the connecting element, in particular the main body of the connecting element, to abut with the contact surface such as to be substantially flush therewith.

The connecting element, in particular the main body, preferably fills a groove that is arranged in the component substantially entirely.

Hereby, substantially entirely filling is to be understood as meaning that a cavity volume of the groove is filled to at least approximately 80%, to at least approximately 90% for example, and in particular to at least approximately 95%.

Provision may be made for the main body to comprise a connecting section for connecting the connecting element to a further connecting element and/or an object.

For example, the connecting section comprises one or more retaining elements, one or more spring elements and/or other elements for enabling a preferably releasable connection to be produced between the connecting element and a further connecting element and/or an object.

Furthermore, the present invention relates to a method for fixing a connecting element of a connecting device to or in a component.

The object of the invention in this respect is to provide a method by means of which a connecting element of a connecting device is easily and reliably fixable in a component.

In accordance with the invention, this object is achieved by a method for fixing a connecting element of a connecting device in a component wherein the method comprises the following:

providing a connecting element of a connecting device which comprises a main body and one or more securing elements, wherein the one or the plurality of securing elements are provided and are formed in one piece with the main body in an initial position of the connecting device;

arranging the connecting element on or in a component and in particular inserting the connecting element into a groove provided in the component;

destroying a predetermined break-away region between the main body and the one or the plurality of securing elements for the purposes of detaching the one or the plurality of securing elements from the main body;

moving the one or the plurality of securing elements from the initial position into a securing position for the purposes of fixing the main body of the connecting element to or in the component, in particular in the groove.

The method according to the invention preferably exhibits one or more of the features and/or the advantages that were described in connection with the connecting device according to the invention.

It can be expedient for the main body and the one or the plurality of securing elements of the connecting element to be manufactured in one piece with one another in an injection moulding process, in particular, in a plastics material injection moulding process.

Furthermore, provision may be made for the predetermined break-away region to be destroyed and for the one or the plurality of securing elements be to moved from the initial position into the securing position by a single actuation of the one or the plurality of securing elements, in particular by applying an actuating force directed in a securing direction or an operating direction.

In particular, for the purposes of connecting two components, provision may be made for a first connecting element of the connecting device to be introduced into a first component. A second connecting element of the connecting device is preferably arranged on or in a second component, and in particular is introduced into the second component. Subsequently, the components are preferably connected to one another in that the connecting elements of the connecting device are fixed together, in particular in releasable manner, by means of clamps, latches, screws, clips, etc. for example.

The one or the plurality of securing elements may be in the form of a locking pin, a securing nail and/or a security bolt for example.

It can be advantageous for the connecting device to comprise one or more auxiliary pins, auxiliary nails and/or auxiliary bolts by means of which, in particular, an effect on the one or the plurality of securing elements is producible.

For example, provision may be made for the connecting device to comprise one or more auxiliary pins, auxiliary nails and/or auxiliary bolts by means of which the one or the plurality of securing elements are moveable into a position differing from the initial position and the securing position.

It can be advantageous if the one or the plurality of securing elements can be moved further out from the main body and be pressed into the component in which the groove for example is arranged by means of the one or the plurality of auxiliary pins, auxiliary nails and/or auxiliary bolts.

When using one or more auxiliary pins, auxiliary nails and/or auxiliary bolts, provision is preferably made for a rear end of the one or the plurality of securing elements to be blunt or flattened with respect to the securing direction, the direction of movement or the operating direction in order to preferably prevent unwanted splitting of the one or the plurality of securing elements during the movement thereof by means of the one or the plurality of auxiliary pins, auxiliary nails and/or auxiliary bolts.

It can be advantageous if the connecting device comprises or forms a guidance device for guiding two components relative to each other, wherein one connecting element comprises a guide groove and/or wherein a (further) connecting element comprises a guidance element.

The guidance element together with the appertaining component is preferably movable and in particular linearly displaceable along the guide groove relative to the further component.

The guide groove is preferably substantially linear.

Provision may be made for the guide groove to comprise a guidance section in which the guidance element interengages with the guide groove.

In particular, provision may be made for the guide groove to comprise an engaging section with which the guidance element can engage.

In one embodiment of the invention, provision is made for the guide groove to be substantially T-shaped.

For example, the guide groove comprises a camming guide for the guidance of the guidance element along a given guide path.

The spacing of the guide path from a contact surface of the component and/or from a bearing surface of the connecting element preferably varies along the guide groove.

Provision may be made for the guide path to comprise two maximum regions having an at least local and in particular, a global maximum spacing from a contact surface of the component and/or from a bearing surface of the connecting element.

Furthermore, provision may be made for the guide path to comprise a minimum region having a local or global minimum spacing from a contact surface of the component and/or from a bearing surface of the connecting element.

It can be advantageous if the guide path comprises a minimum region which is arranged between the maximum regions and is at a locally minimum spacing from a contact surface of the component and/or from a bearing surface of the connecting element and which also comprises run-out regions that are arranged such as to adjoin the maximum region and to be remote from the minimum region with reducing distance from a contact surface of the component and/or from a bearing surface of the connecting element.

Provision may be made for the supporting surface to border on a contact surface of the component at both sides. The contact surface then preferably bounds the longitudinal section in the form of an arc of a circle at both sides.

The groove is preferably in the form of a segment of a circle, wherein one boundary of the segment of a circle is a groove base surface in the form of an arc of a circle and a further boundary of the segment of a circle is the contact surface.

Provision could also be made however for the groove to be in the form of a partial groove.

For example, the supporting surface only borders on a contact surface of the component at one side. A side of the supporting surface remote from the contact surface then preferably ends at a surface of the component that differs from the contact surface or it ends within the component.

In this description and the accompanying Claims, a side of a supporting surface is to be understood in particular as an end which bounds the supporting surface along the longitudinal section in the form of an arc of a circle.

Further preferred features and/or advantages of the present invention form the subject matter of the following description and the graphical illustration of exemplary embodiments.

BRIEF DESCRIPTION OF THE DRAWINGS

FIG. 1 shows a schematic perspective illustration of two components which are connectable to one another by means of a connecting device and which, for this purpose, comprise two grooves having undercut sections;

FIG. 2 a partly transparent illustration of the components depicted in FIG. 1;

FIG. 6 a partly sectional schematic perspective illustration of the connecting device and the components depicted in FIG. 5;

FIG. 7 a schematic illustration corresponding to FIG. 5 of the connecting device and the components, wherein the components are connected to one another by means of the connecting device;

FIG. 10 a schematic partly transparent side view of a second embodiment of a connecting device and of a component in which the connecting device is arranged;

FIG. 11 a schematic cross section through the connecting device and the component depicted in FIG. 10;

FIG. 12 a schematic plan view from above of the connecting device and the component depicted in FIG. 10;

FIG. 15 an enlarged illustration of the region XV in FIG. 14;

FIG. 16 an illustration corresponding to FIG. 10 of the second embodiment of the connecting device and the component, wherein securing elements of the connecting device are arranged in a securing position;

FIG. 17 a schematic illustration corresponding to FIG. 11 of the connecting device and the component depicted in FIG. 16.

Similar or functionally equivalent elements are provided with the same reference symbols in all of the Figures.

DETAILED DESCRIPTION OF THE DRAWINGS

Figure 3:
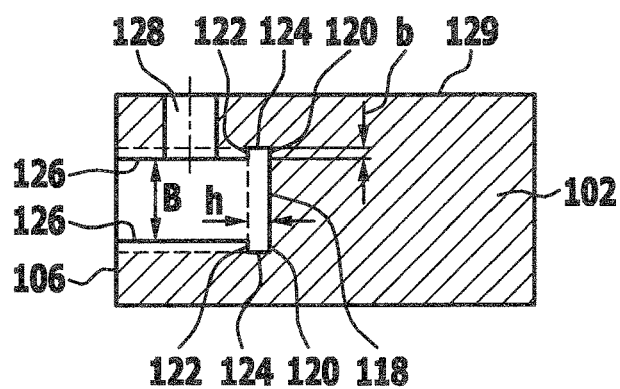
FIG. 3 a schematic cross section through one of the components depicted in FIG. 1.
Figure 4:
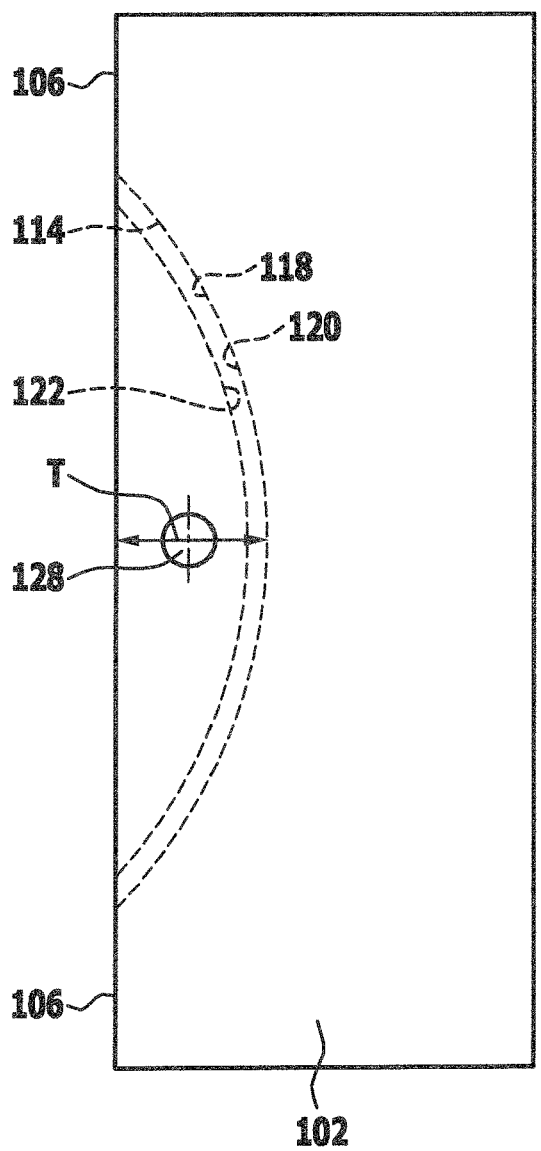
FIG. 4 a schematic partly transparent side view of the component depicted in FIG. 3.

A connecting device designated as a whole by 100 serves, for example, for connecting a first substantially plate-like component 102 to a second likewise substantially plate-like component 104 (see FIGS. 1 to 4).

The two components 102 and 104 consist of wood or plywood for example, but could also consist of any other materials such as a metallic material or a plastics material (e.g. Plexiglas) for example. Furthermore, provision may be made for the first component 102 and the second component 104 to consist of mutually different materials.

In the connected state of the two components 102 and 104, a contact surface 106 of the first component 102 which forms a narrow side of the first component 102 abuts a contact surface 108 of the second component 104 which forms a major face of the second component 104.

A respective groove 110 which is formed in the components 102 and 104 concerned opens out into each of the contact surfaces 106, 108 and comprises a base section 112 in the form of a segment of a circular cylinder or a section of a circular cylinder and two undercut sections 114 which extend from away the base section 112 in a thickness direction 116.

The radius of curvature of the base section 112 is greater than the groove depth T (see FIG. 4) so that the curved bottom surface of the groove 118 intersects the respective contact surface 106, 108 at an acute angle.

The base section 112 of the groove 110 has a width B of approximately 8 mm for example in the thickness direction 116.

Each of the undercut sections 114 of the groove 110 is bounded on the side thereof remote from the respective contact surface 106 and 108 by a bottom surface 120 which is flush with the bottom surface of the groove 118 and is in the form of a section of the surface of a circular cylinder and has the same radius of curvature as the bottom surface of the groove 118 of the base section 112.

In the direction toward the contact surface 106 or 108, each undercut section 114 is bounded by an undercut surface 122 which is likewise in the form of a section of the surface of a circular cylinder and is concentric with the bottom surface 120 and it has a smaller radius of curvature.

Each of the undercut sections 114 is bounded laterally by a lateral boundary surface 124 which runs perpendicularly to the respective contact surface 106 and 108.

The width b, i.e. the extent thereof in the thickness direction 116, amounts to approximately 1 mm for example for each of the undercut sections 114.

The height h, i.e. the distance between the bottom surface 120 and the undercut surface 122, amounts to approximately 2 mm for example for each of the undercut sections 114.

The base section 112 of each groove 110 is bounded by lateral boundary walls 126 which run substantially perpendicularly to the respective contact surface 106 and 108 and are spaced from each other by the groove width B.

As can be seen from FIG. 3 for example, a substantially cylindrical access opening 128 and in particular, an access bore running perpendicularly to one of the lateral boundary walls 126 opens out into the groove 110 of the first component 102 whilst the other end thereof opens out into a major face 129 of the first component 102 and thereby enables access to be made to the base section 112 of the groove 110 from a space outside the first component 102.

In order to produce the grooves 110 described hereinabove in the components 102 and 104, the groove milling device described in EP 1 990 549 A1 for example can be used.

For the purposes of connecting the components 102, 104 to one another, one or more grooves 110 and in particular grooves 110 of the type described hereinabove can be provided in each of the components 102, 104.

Provision may also be made however for just one of the components 102, 104 to be provided with one or more grooves 110 and in particular grooves 110 of the type mentioned hereinabove, whereas the other component 104, 102 has no groove 110 of the type described hereinabove, or a differently formed groove 110, one or more borings, one or more recesses, one or more projections and/or one or more cut-outs or is left in its original state.

Various embodiments of connecting device 100 for connecting components 102, 104 are described in the following.

A first embodiment of a connecting device 100 that is illustrated in FIGS. 5 to 9 comprises a connecting element 130 which is insertible into a groove 110 and a connecting element 130 of the plug-in type.

A connecting element 130 which is insertible into a groove 110 is preferably to be understood as being a connecting element 130 that is insertible into a groove 110 which comprises a base section 112 and one or more undercut sections 114 that extend away from the base section 112 in a thickness direction 116. The one undercut section 114 or the plurality of undercut sections 114 preferably have one or more undercut surfaces 122 which are formed and arranged concentrically to the base section 112. In particular hereby, the undercut surface 122 or the undercut surfaces 122 are in the form of a section of the surface of a circular cylinder.

A connecting element 130 that is insertible into a groove 110 preferably comprises a main body 134 which comprises a base part 136 corresponding to the base section 112 of the groove 110 and one or more retaining projections 138 corresponding to the undercut sections 114.

The retaining projections 138 each comprise a curved supporting surface 140 which is in the form of an arc of a circle in longitudinal section.

In particular, the retaining projections 138 are formed such as to be non-self-cutting.

In this description and the accompanying Claims, a longitudinal section, a longitudinal direction, etc. is to be understood as being a section or a movement of the connecting element 130 in a plane in which a path of movement of the connecting element 130 lies when the element is being pushed into a groove 110.

In particular, a longitudinal section is a section taken perpendicularly with respect to an axis of symmetry of the supporting surfaces 140 of the connecting element 130.

A cross section is to be understood in particular, as being a section taken perpendicularly with respect to a longitudinal section, for example, a section taken perpendicularly with respect to a contact surface 106, 108 and parallel to the axis of symmetry of the supporting surfaces 140 of the connecting element 130.

Preferably, a cross section is a section along a plane in which the axis of symmetry of the supporting surfaces 140 of the connecting element 130 extends.

In the first embodiment of the connecting device 100 illustrated in FIGS. 5 to 9, the actual connection of the two connecting elements 130 and the components 102, 104 to one another is effected by a guidance device 142.

The guidance device 142 comprises a guidance element 144 which is arranged on a connecting element 130 and comprises one or more guidance projections 146.

In particular, the guidance element 144 is insertible into a guide groove 148 of the other connecting element 130.

This guide groove 148 comprises a guidance section 150 which is engageable by the guidance element 144 by means of the guidance projections 146.

In particular, the guidance device 142 comprises a camming guide 152 which is formed by the guide groove 148.

The camming guide 152 serves, in particular, for guiding the guidance element 144 along a given guide path.

This guide path 148 is located at varying distances from the contact surfaces 106, 108 of the components 102, 104 along the guide groove.

In particular, the camming guide 152 provides a local minimum region 154 which is surrounded by two local or global maximum regions 156.

The maximum regions 156 are surrounded by run-out regions 158 on the side thereof remote from the minimum region 154.

For the purposes of connecting the connecting elements 130 and the components 102, 104 to one another, the connecting elements 130 are firstly arranged on the components 102, 104.

In a next step, the components 102, 104 together with the connecting elements 130 arranged thereon are displaced relative to each other so that the guidance element 144 of the one connecting element 130 enters the guide groove 148 of the further connecting element 130.

In particular, the components 102, 104 and the connecting elements 130 are displaced in parallel with the contact surfaces 106, 108 of the components 102, 104.

The guidance projection 146 firstly comes into engagement with a run-out region 158 and is then guided across the maximum region 156 into the minimum region 154.

Due to the further maximum region 156 which follows upon this minimum region 154, this minimum region 154 is a stable position for the guidance projection 146 along the guide path that is formed by means of the camming guide 152.

The connecting elements 130 are thus connected to one another in a stable manner when the guidance projection 146 is arranged within the minimum region 154 of the camming guide 152 (see in particular FIG. 7).

In principle, the guidance projection 146 together with the appertaining connecting element 130 and the appertaining component 102, 104 can also be pushed over the further maximum region 156 and then out of the further run-out region 158.

The connecting elements 130 are thus displaceable completely past each other if so required.

However, provision could also be made for the connecting elements 130 not to be displaceable completely past each other. As can be perceived from FIGS. 7 and 8 in particular, a one-sided delimitation of the path of movement of the connecting elements 130 can be formed by means of a stop element 160 for example.

In the embodiment illustrated in FIGS. 5 to 9, the stop element 160 is a (yet to be described) auxiliary pin or an auxiliary bolt.

For the purposes of fixing the connecting elements 130 of the connecting device 100 in the components 102, 104, a respective groove 110 of the type illustrated in FIGS. 1 to 4 can be provided in the components 102, 104. For example, connecting elements 130 that are complementary thereto at least in sections thereof can then be pushed into the components 102, 104 and fixed therein in a particularly simple manner.

However, in contrast thereto in the case of the embodiment of the connecting device 100 that is illustrated in FIGS. 5 to 9, provision is made for only one of the connecting elements 130 to be insertible into such a groove 110.

The other connecting element 130 is a plug-in type connecting element 130 which comprises two plug-in sections 162 for example.

The plug-in sections 162 are, for example, substantially cylindrical and in particular substantially circularly cylindrical and are preferably provided with a corrugation, with ribs and/or with retaining elements, in particular, barbs.

In particular, the plug-in sections 162 are insertible into circularly cylindrical borings 164 in one of the components 102, 104 in order to fix the plug-in type connecting element 130 to the component 102, 104.

Furthermore, the plug-in type connecting element 130 comprises a latching device 166 for latching the connecting element 130 to the stop element 160.

In particular, the latching device 166 comprises two latch arms 168 which engage the stop element 160 for example for the purposes of latching the connecting elements 130 to one another.

For the purposes of latching the connecting elements 130 and/or the components 102, 104 to one another, the components 102, 104 including the connecting elements 130 arranged therein are movable and in particular displaceable relative to each other in a direction of movement 170. In particular, this direction of movement 170 is aligned such as to be parallel to the contact surfaces 106, 108 of the components 102, 104 and parallel to the longitudinal direction of the connecting elements 130 and/or the groove 110.

The latch arms 168 are arranged at mutually opposite ends 172 of the plug-in type connecting element 130 with respect to the direction of movement 170.

Preferably, both the plug-in type connecting element 130 and the connecting element 130 that is insertible into the groove 110 are at least approximately mirror-symmetrical with respect to a transverse central axis 174 which is orientated in a direction perpendicular to the direction of movement 170.

The connecting elements 130 are thereby universally suitable for a variety of applications.

In principle, the connecting element 130 which is insertible into a groove 110 of the type illustrated in FIGS. 1 to 4 is freely displaceable in this groove 110.

It can be advantageous however to fix the connecting element 130 in the groove 110.

To this end, the connecting device 100 comprises one or more securing elements 176.

For example, two securing elements 176 are provided for fixing the connecting element 130 in the groove 110.

The securing elements 176 are, for example, in the form of a locking pin 178 or in the form of security bolts 180.

The stop element 160 that has already been mentioned previously is formed by an auxiliary pin 182 or an auxiliary bolt 184 of the connecting device 100 for example.

The securing elements 176 are connected to the main body 134 in an initial state of the connecting device 100 for example. The securing elements 176 are moveable from an initial position into the securing position illustrated in FIGS. 5 to 8 by means of a (not illustrated) operating device.

The auxiliary pin 182 or auxiliary bolt 184 can then be arranged on the connecting element 130, in particular, after the process of actuating the one or the plurality of securing elements 176. In particular, the auxiliary pin 182 or auxiliary bolt 184 can be inserted into a seating device (a through opening) for a securing element 176, wherein the securing element 176 can be moved from an initially occurring securing position into a further (securing) position (see in particular FIGS. 5 and 7).

The exact structure and manner of functioning of a connecting element 130 with securing elements 176 will be described hereinafter with the aid of a second embodiment of a connecting device 100 which is illustrated in FIGS. 10 to 18. All of the features and/or advantages described hereinafter are also preferably realised in the first embodiment of the connecting device 100 that is illustrated in FIGS. 5 to 9.

For the purposes of providing a simple explanation of the functioning of the securing elements 176, the connecting element 130 of a connecting device 100 that is illustrated in FIGS. 10 to 18 does not comprise a separate connecting section for connecting the connecting element 130 to a further connecting element 130.

In principle, the connecting element 130 in accordance with the embodiment illustrated in FIGS. 10 to 18 can be provided with any sort of device for latching, clipping, inter-engaging, clamping or some other sort of way of connecting two connecting elements 130.

Figure 14:
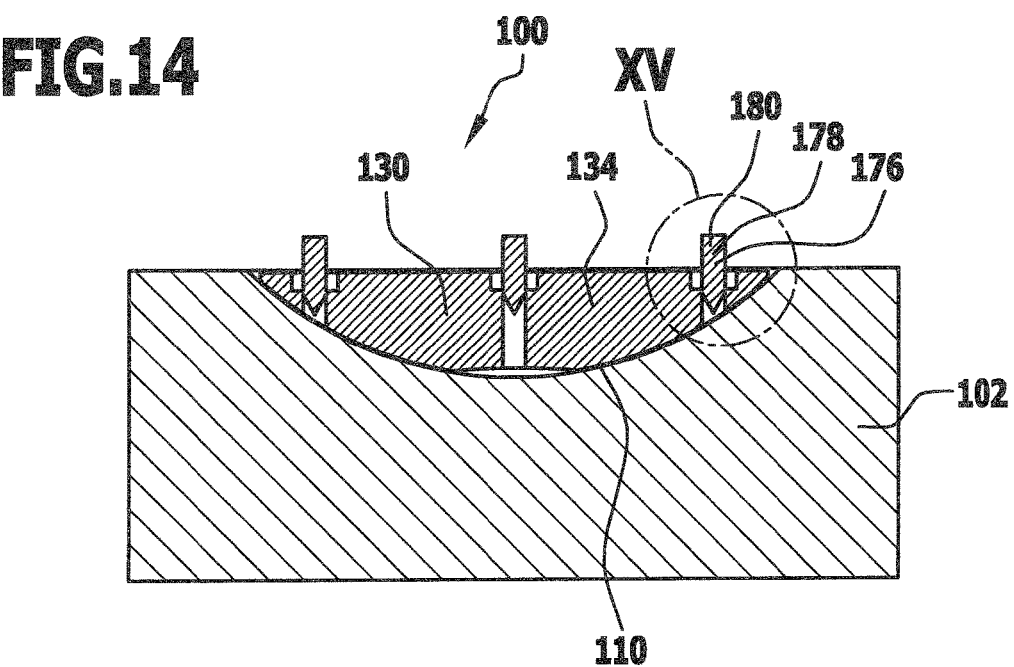
FIG. 14 a schematic longitudinal section through the connecting device and the component depicted in FIG. 10 along the line 14-14 in FIG. 12.

As can be perceived from FIGS. 14 and 15 in particular, the connecting element 130 comprises the main body 134 and one or more, two or three for example, securing elements 176.

Hereby, the main body 134 and the one or the plurality of securing elements 176 are formed in one piece with one another.

In particular, the main body 134 and the one or the plurality of securing elements 176 are in the form of a one piece injection moulded component.

The main body 134 comprises one or more through openings 186 in which the one or the plurality of securing elements 176 are arranged.

Both the one or the plurality of securing elements 176 and the one or the plurality of through openings 186 are substantially circularly cylindrical.

In particular, the one or the plurality of through openings 186 are, at least in sections thereof, substantially complementary to at least one section of the one or the plurality of securing elements 176.

The one or the plurality of through openings 186 thus comprise a guide section 188 by means of which the one or the plurality of securing elements 176 can be guided or led. In particular, the securing elements 176 can be guided or led along a securing direction 190 by means of the respective guide section 188.

Furthermore, the one or the plurality of through openings 186 preferably comprises a respective bearing section 192 on which a (not illustrated) operating device is placeable for operating and in particular moving the one or the plurality of securing elements 176.

In particular, a bearing section 192 is in the form of an annular recess 194 in the main body 134.

The annular recess 194 surrounds the securing element 176 in particular.

A region in which the main body 134 and the one or the plurality of securing elements 176 merge into one another is a predetermined break-away region 196.

In particular, this predetermined break-away region 196 is substantially circular and adjoins the bearing section 192 for example.

For example, a securing element 176 comprises a pointed end 198 which is arranged at the front with respect to the securing direction 190.

In particular, a rear end of a securing element 176 is in the form of a flat end 200 with respect to the securing direction 190.

In the initial state (initial position) of the connecting element 130 that is illustrated in FIGS. 10 to 15, the one or the plurality of securing elements 176 project out from the through opening 186 at a first end 202 of the through opening 186.

The pointed end 198 of the one or the plurality of securing elements 176 is preferably arranged to be entirely in the main body 134 and in particular arranged to be within an outer contour of the main body 134.

Due to the actuation of a securing element 176, the securing element 176 is movable along the through opening 186 in the securing direction 190 so that, in particular, the flat end 200 is moved into the main body 134, whilst the pointed end 198 is moved out from the main body 134.

Figure 18:
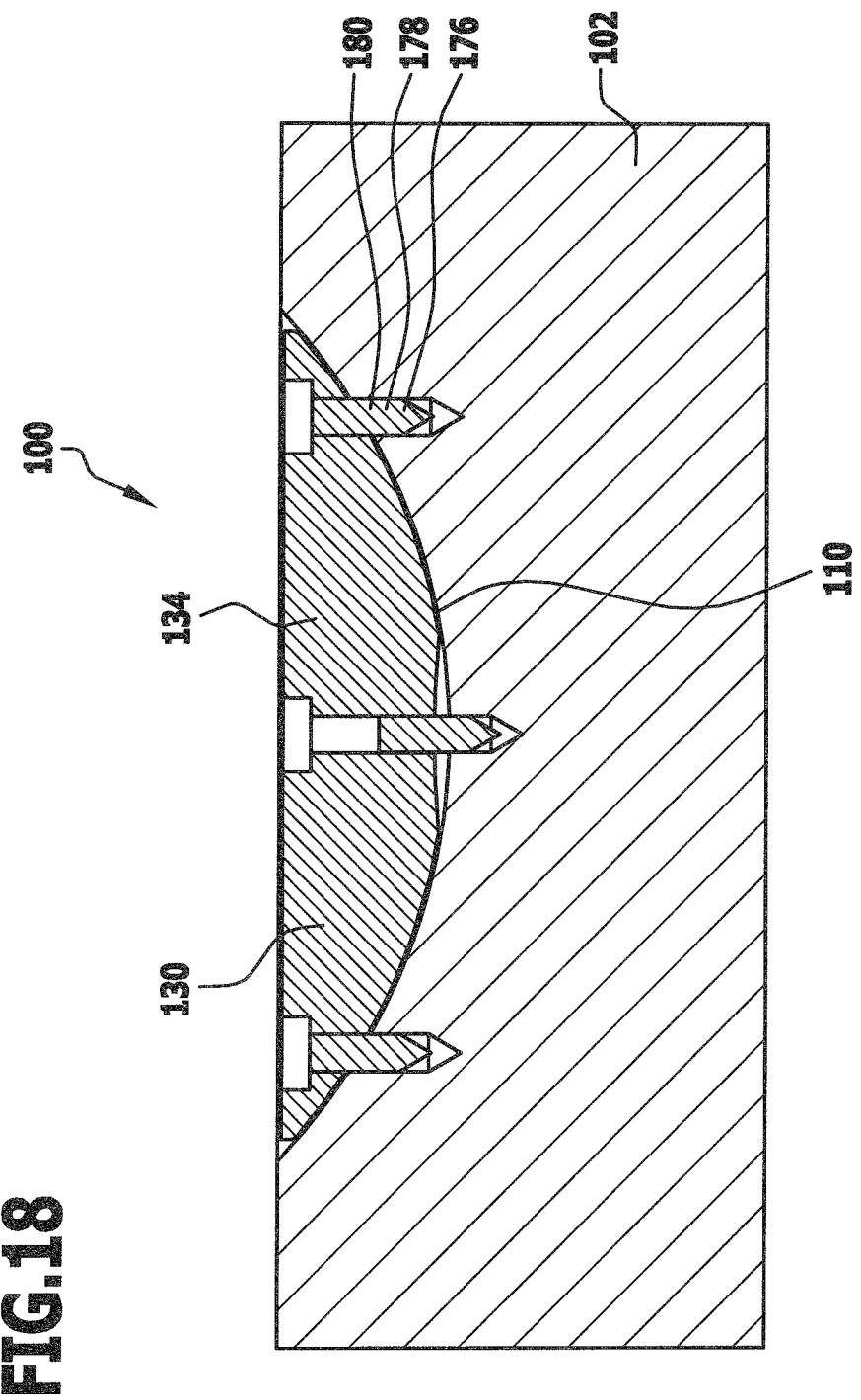
FIG. 18 a schematic illustration corresponding to FIG. 14 of the connecting device and the component depicted in FIG. 16.

In this securing position of the securing element 176 that is illustrated in FIGS. 16 to 18, the securing element 176 then projects out from the through opening 186 at a second end 204 of the through opening 186 which is located opposite the first end 202.

For the purposes of securely fixing the connecting element 130 in a groove 110, the securing direction 190 of the securing element 176 is oriented transversely, for example, at an angle or perpendicularly to a direction of insertion 206 of the connecting element 130.

Thus, by a process of actuating the securing element 176, the connecting element 130 is fixable in the groove 110, in particular, with positive engagement.

The previously described embodiment of the connecting device 100 and thus the securing of a connecting element 130 in a groove 110 functions as follows:

Firstly, a groove 110 of the type illustrated in accordance with FIGS. 1 to 4 is formed in a component 102.

In addition, a connecting element 130 of the connecting device 100 having a shape complementary to that of the groove 110 at least in sections thereof is prepared.

In particular, the connecting element 130 is in the form of a one-piece injection moulded component.

One or more securing elements 176 of the connecting element 130 are preferably provided in the initial position and are thereby connected in one piece manner to the main body 134.

In the initial position of the one or the plurality of securing elements 176, the connecting element 130 is slid in the direction of insertion 206 into a groove 110 until the main body 134 of the connecting element 130 is arranged in a given position.

Next, the securing elements 176 are actuated for the purposes of anchoring the main body 134 in this position.

To this end, the (not illustrated) operating device is placed on the one or the plurality of bearing sections 192 of the connecting element 130.

The securing elements 176 are then actuated by a process of actuating the operating device, in particular, by applying an actuating force.

In particular thereby, the securing elements 176 are subjected to a force that is effective in the securing direction 190, for example, in that a thrust force is exerted on the flat end 200 of the respective securing element 176 by means of the operating device.

Due to this application of force, the predetermined break-away region 196 between the main body 134 and the respective securing element 176 is destroyed.

The one or the plurality of securing elements 176 are thus detached from the main body 134 and thereupon moved in the securing direction 190.

It is ensured that the securing elements 176 are moved in the given securing direction 190 by means of the guide section 188.

As can be perceived especially from FIGS. 16 to 18, the securing elements 176 are thereby rammed, in particular, into the component 102.

Preferably, the securing elements 176 are moved to such an extent that the securing elements 176 are arranged partly in the main body 134 and partly in the component 102.

The securing elements 176 thereby produce a locking effect for the main body 134 with respect to the direction of insertion 206 in order to finally fix the main body 134 in the groove 110 in the desired position.

Figure 5:
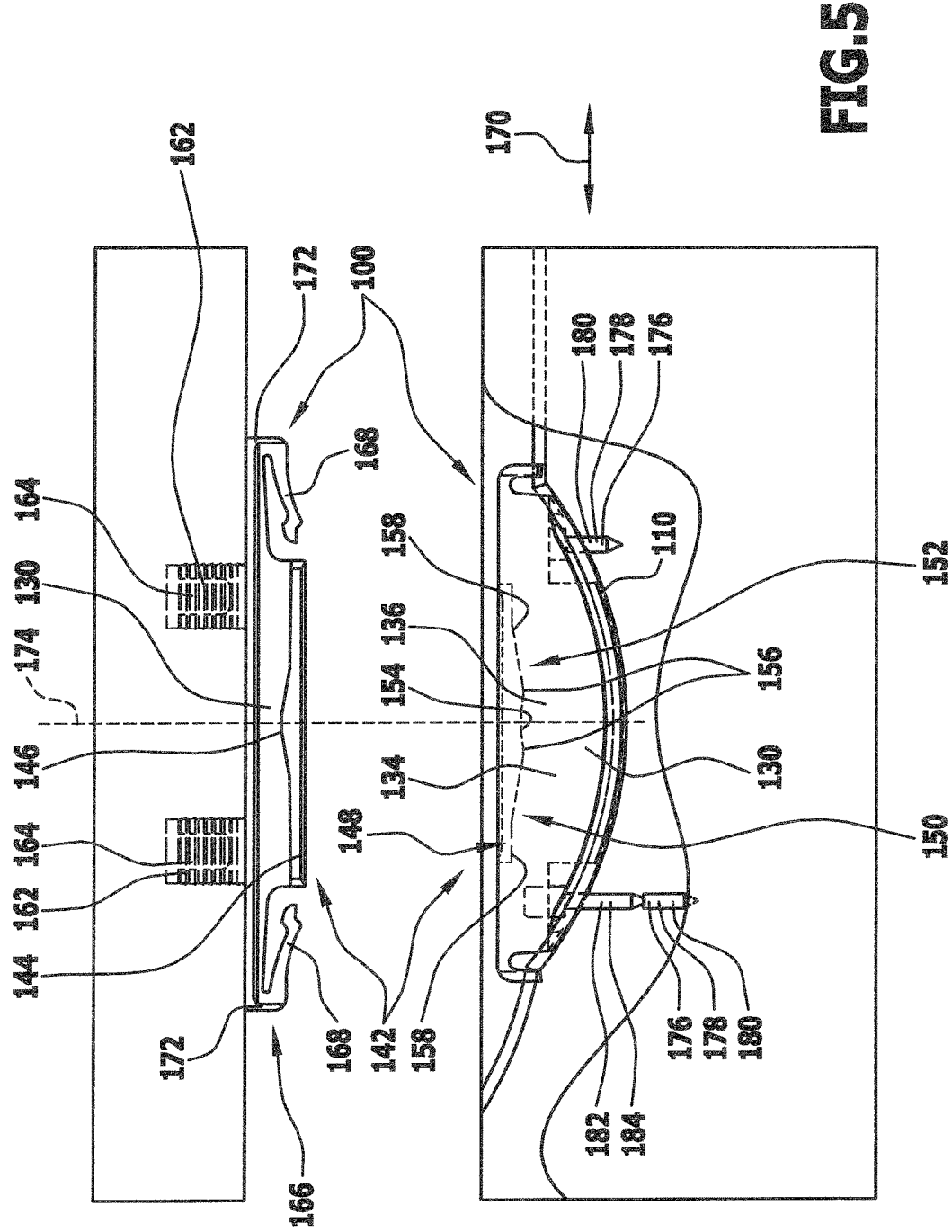
FIG. 5 a schematic longitudinal section through a first embodiment of a connecting device which comprises two connecting elements, wherein the connecting elements are arranged on components that are separated from each other.
Figure 9:
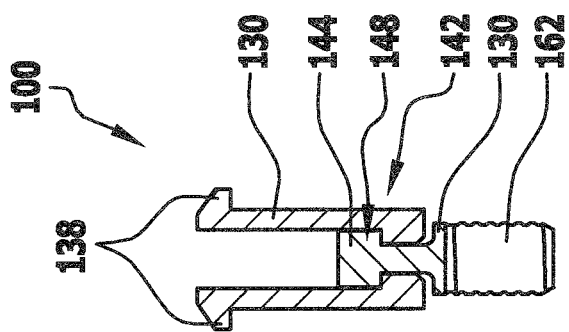
FIG. 9 a schematic cross section through the connecting device depicted in FIG. 5 in the connected state of the connecting elements.
Figure 8:
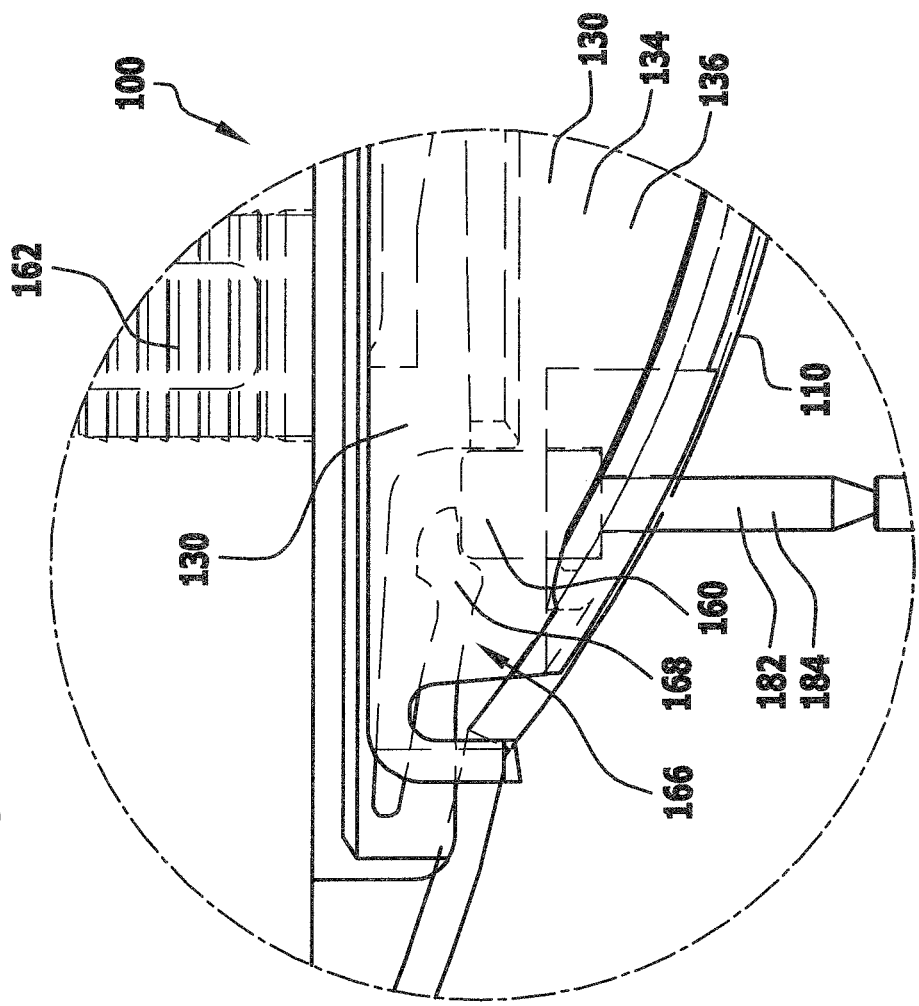
FIG. 8 an enlarged illustration of the region VIII in FIG. 7.
Figure 13:
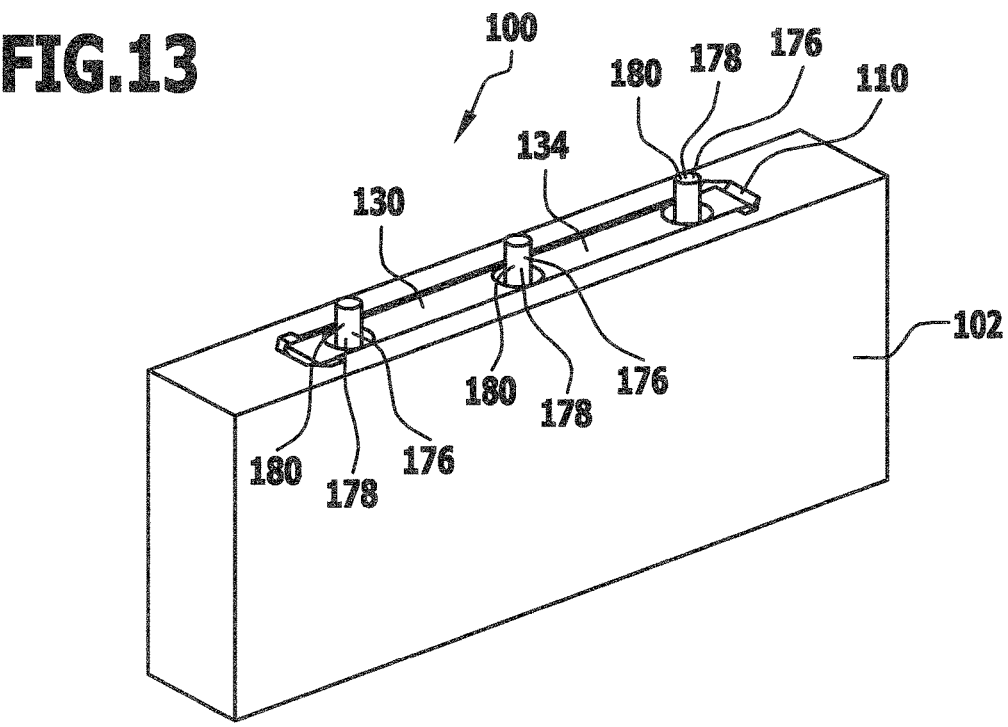
FIG. 13 a schematic perspective illustration of the connecting device and the component depicted in FIG. 10.

For example, an additional actuation of one or more securing elements 176 can be effected by means of an auxiliary pin 182 or an auxiliary bolt 184 (see in particular, FIGS. 5 and 7).

In particular, such an auxiliary pin 182 or auxiliary bolt 184 can be used for moving the securing element 176 entirely out from the main body 134 and into the component 102.

For example, (yet) firmer anchorage of the connecting element 130 in the groove 110 can be realised by means of such an auxiliary pin 182 or such an auxiliary bolt 184. As an alternative or in addition thereto, an additional functional component such as a stop element 160 for example can be arranged on the connecting element 130 by means of such an auxiliary pin 182 or such an auxiliary bolt 184.

As has already been previously explained, FIGS. 10 to 18 serve primarily for illustrating the functioning of the securing elements 176.

In particular in regard to the remaining shape and functioning of the main body 134 for the fixation thereof in a groove 110, the embodiment illustrated in FIGS. 10 to 18 corresponds to the embodiment illustrated in FIGS. 5 to 9 so that to this extent, reference should be made to the previous description.

Due to the fact that the connecting device 100 preferably comprises a main body 134 and one or more securing elements 176 that are formed in one piece with the main body 134, there is provided a connecting element 130 of the connecting device 100 which is easy to handle and reliably fixed.

LIST OF REFERENCE SYMBOLS 100 connecting device
102 component
104 component
106 contact surface
108 contact surface
110 groove
112 base section
114 undercut section
116 thickness direction
118 bottom surface of the groove
120 bottom surface
122 undercut surface
124 lateral boundary surface
126 lateral boundary wall
128 access opening
129 major face
130 connecting element
134 main body
136 base part
138 retaining projection
140 supporting surface
142 guidance device
144 guidance element
146 guidance projection
148 guide groove
150 guidance section
152 camming guide
154 minimum region
156 maximum region
158 run-out region
160 stop element
162 plug-in section
164 boring
166 latching device
168 latch arm
170 direction of movement
172 end
174 transverse central axis
176 securing element
178 locking pin
180 security bolt
182 auxiliary pin
184 auxiliary bolt
186 through opening
188 guide section
190 securing direction
192 bearing section
194 annular recess
196 predetermined break-away region
198 pointed end
200 flat end
202 first end
204 second end
206 direction of insertion
B groove width
T groove depth
b breadth
h height

The invention claimed is:

1. A connecting device for fixing and/or connecting components or objects, or for fixing and/or connecting furniture or machine parts, wherein at least one connecting element of the connecting device is fixable in or to a component, the connecting element comprising:
a main body having one or more holes; and
one or more securing elements,
wherein the one or the plurality of securing elements are formed in one piece with the main body in an initial position of the connecting device,
wherein the one or the plurality of securing elements are detachable from the main body by destroying a predetermined break-away region between the main body and the one or the plurality of securing elements,
wherein the one or the plurality of securing elements are moveable in relation to the one or more holes from the initial position into a securing position for the purposes of fixing the main body in or to the component,
wherein the one or the plurality of securing elements are cylindrically shaped,
wherein the one or the plurality of securing elements having a top end diameter and a bottom end diameter,
wherein the one or more holes are cylindrically shaped,
wherein the one or more holes having an entrance diameter, an exit diameter, and a center diameter, and
wherein the top end diameter and the bottom end diameter of the one or the plurality of securing elements are less than or equal to the entrance diameter, the exit diameter, and the center diameter of the one or more holes.

2. The connecting device in accordance with claim 1, wherein the at least one connecting element comprises one or more securing elements in the form of locking pins or security bolts.

3. The connecting device in accordance with claim 1, wherein the main body comprises a guide section by means of which and/or along which the one or the plurality of securing elements are guidable or conveyable from the initial position into the securing position.

4. The connecting device in accordance with claim 3, wherein the guide section is formed by one or more through openings in the main body within which the one or the plurality of securing elements are guided or led.

5. The connecting device in accordance with claim 1, wherein the one or the plurality of securing elements project out of one or more through openings of the main body in the initial position and/or in the securing position.

6. The connecting device in accordance with claim 1, wherein the one or the plurality of securing elements project out of one or more through openings of the main body in mutually different directions in the initial position in a first direction and in the securing position in a second direction, and
wherein said first direction is a different direction as compared to said second direction.

7. The connecting device in accordance with claim 1, wherein the predetermined break-away region between the main body and the one or the plurality of securing elements is recessed in the main body.

8. The connecting device in accordance with claim 1, wherein the main body and the one or the plurality of securing elements are in the form of a one piece injection moulded component in the initial position of the one or the plurality of securing elements.

9. The connecting device in accordance with claim 1, wherein the main body comprises a bearing section upon which there is placeable an operating device by means of which the one or the plurality of securing elements are moveable from the initial position into the securing position.

10. The connecting device in accordance with claim 9, wherein the bearing section comprises one or more annular recesses which are arranged, concentrically and/or coaxially around the one or the plurality of securing elements.

11. The connecting device in accordance with claim 1, wherein the main body is insertible in a direction of insertion into a groove which is provided in or on the component.

12. The connecting device in accordance with claim 11, wherein the one or the plurality of securing elements are movable transversely and at an angle or perpendicularly to the direction of insertion for the purposes of fixing said elements in the securing position.

13. The connecting device in accordance with claim 1, wherein the main body comprises a curved bearing surface which is in the form of an arc of a circle in a longitudinal section.

14. The connecting device in accordance with claim 1, wherein the main body comprises one or more non-self-cutting retaining projections.

15. The connecting device in accordance with claim 14, wherein the one or the plurality of non-self-cutting retaining projections each have a curved supporting surface which is in the form of an arc of a circle in a longitudinal section.

16. The connecting device in accordance with claim 1, wherein at least one connecting element is arrangeable substantially entirely in a groove of the component so that the at least one connecting element does not project beyond a contact surface of the component.

17. The connecting device in accordance with claim 1, wherein the main body comprises a connecting section for connecting the connecting element to a further connecting element and/or to an object.

18. A method of fixing a connecting element of a connecting device to or in a component, the method comprising:
providing a connecting element of a connecting device which comprises a main body having one or more holes and one or more securing elements, wherein the one or the plurality of securing elements are provided and are formed in one piece with the main body in an initial position of the connecting device;
arranging the connecting element on or in a component and inserting the connecting element into a groove that is provided in the component;
destroying a predetermined break-away region between the main body and the one or the plurality of securing elements for the purposes of detaching the one or the plurality of securing elements from the main body; and
moving, in relation to the one or more holes, the one or the plurality of securing elements from the initial position into a securing position for the purposes of fixing the main body of the connecting element to or in the component, or in the groove, wherein
the one or the plurality of securing elements are cylindrically shaped,
the one or the plurality of securing elements having a top end diameter and a bottom end diameter,
the one or more holes are cylindrically shaped,
the one or more holes having an entrance diameter, an exit diameter, and a center diameter, and
the top end diameter and the bottom end diameter of the one or the plurality of securing elements are less than or equal to the entrance diameter, the exit diameter, and the center diameter of the one or more holes.

19. The method in accordance with claim 18, wherein the main body and the one or the plurality of securing elements of the connecting element are manufactured in one piece with one another in an injection moulding process, or in a plastics material injection moulding process.

20. The method in accordance with claim 18, wherein the predetermined break-away region is destroyed and the one or the plurality of securing elements are moved from the initial position into the securing position by a single actuation of the one or the plurality of securing elements, or by applying an actuating force directed in a securing direction.

* * * * *